No. 631,851. Patented Aug. 29, 1899.
H. R. KEITHLEY.
METHOD OF AND APPARATUS FOR MAKING ROLL DRAWN TUBING.
(Application filed Nov. 11, 1898.)
(No Model.) 3 Sheets—Sheet 1.
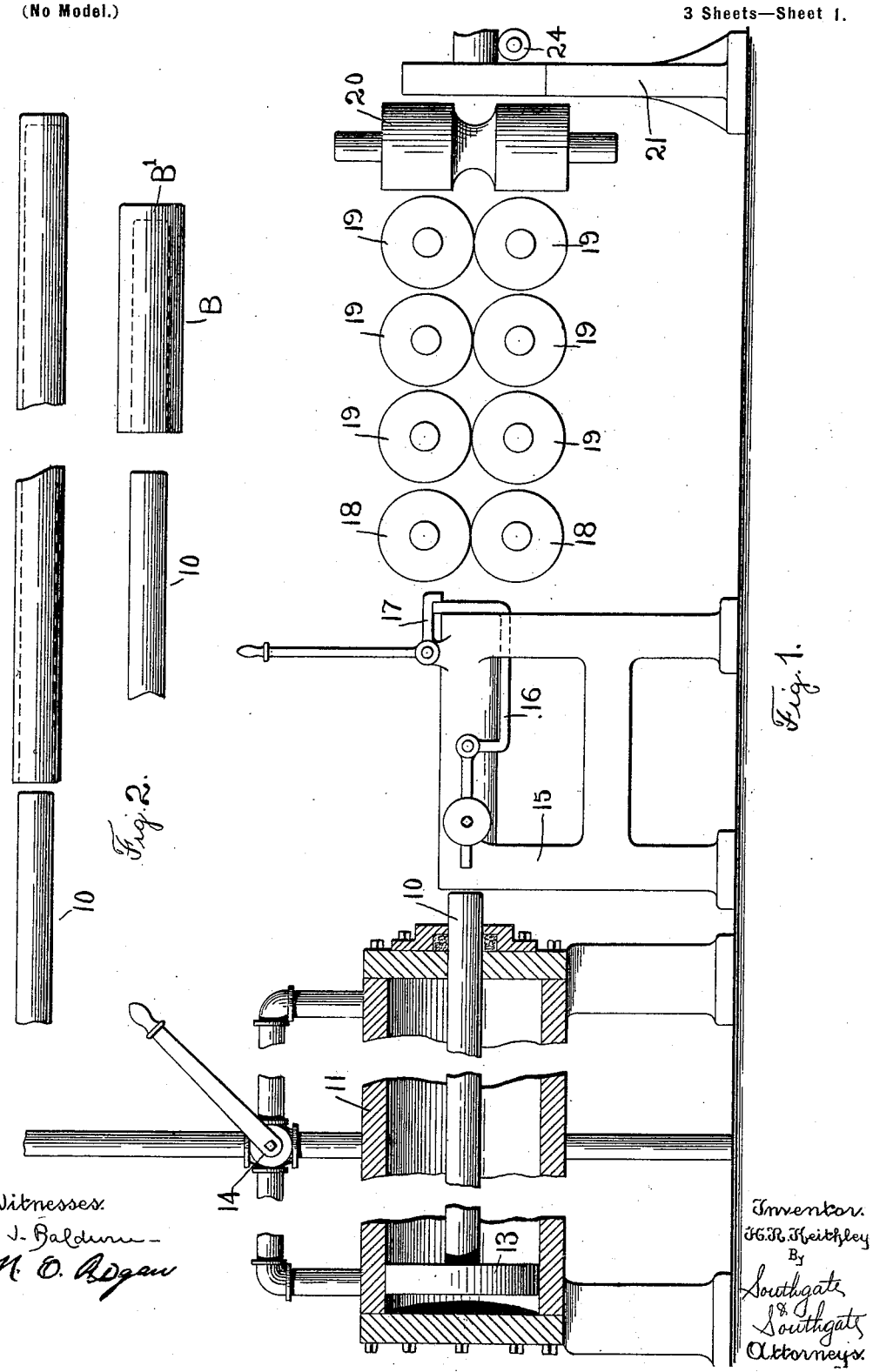

No. 631,851. Patented Aug. 29, 1899.
H. R. KEITHLEY.
METHOD OF AND APPARATUS FOR MAKING ROLL DRAWN TUBING.
(Application filed Nov. 11, 1898.)
(No Model.) 3 Sheets—Sheet 2.

Witnesses.
W. J. Baldwin
M. E. Regan

Inventor.
H. R. Keithley.
By Southgate & Southgate
Attorneys.

THE NORRIS PETERS CO., PHOTO-LITHO., WASHINGTON, D. C.

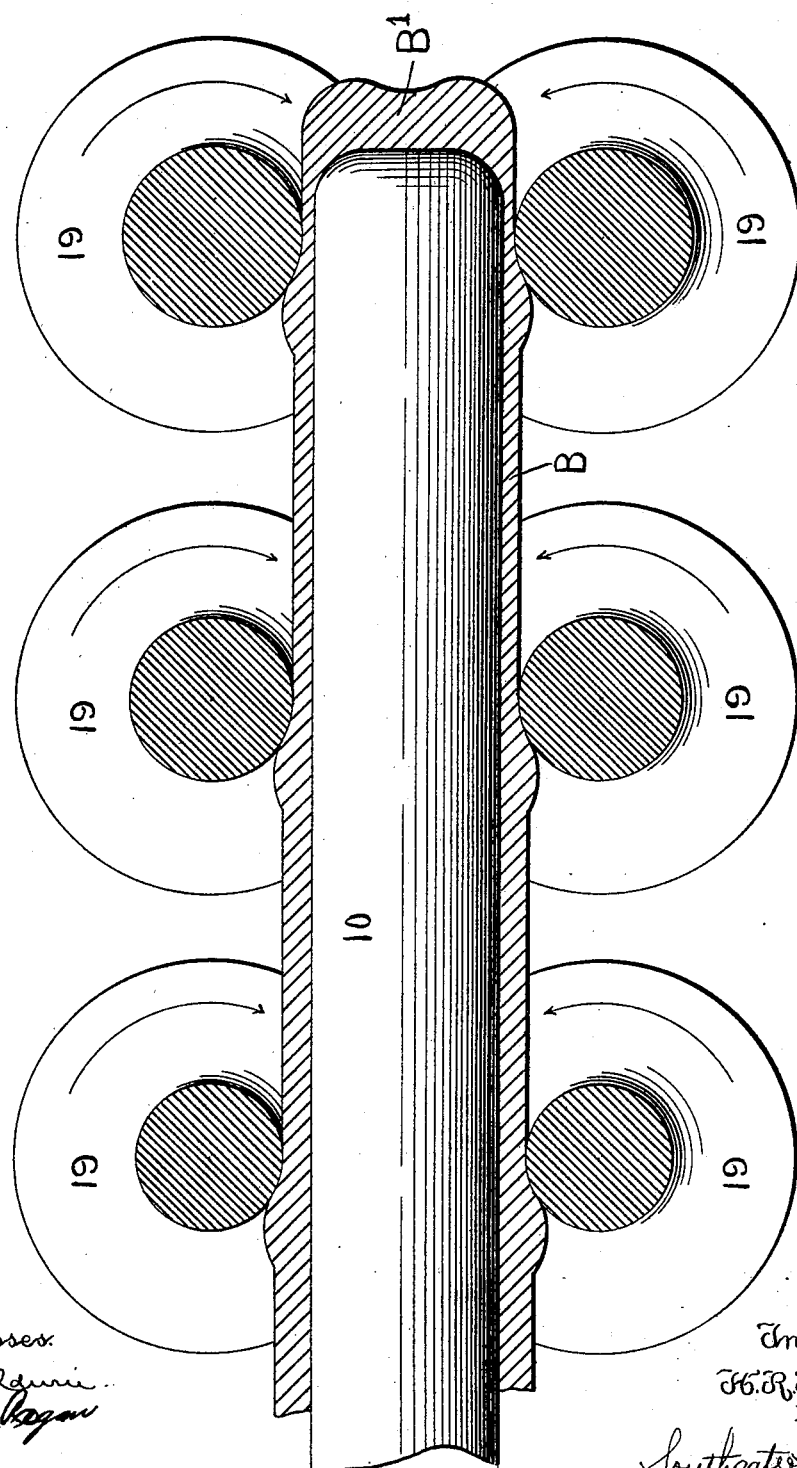

UNITED STATES PATENT OFFICE.

HERBERT R. KEITHLEY, OF NEW YORK, N. Y.

METHOD OF AND APPARATUS FOR MAKING ROLL-DRAWN TUBING.

SPECIFICATION forming part of Letters Patent No. 631,851, dated August 29, 1899.

Application filed November 11, 1898. Serial No. 696,136. (No model.)

*To all whom it may concern:*

Be it known that I, HERBERT R. KEITHLEY, a citizen of the United States, residing at New York, in the county of New York and State of New York, have invented a new and useful Method of and Apparatus for Making Roll-Drawn Tubing, of which the following is a specification.

The object of this invention is to provide an improved method and apparatus for the economic manufacture of seamless tubing of superior density and toughness.

To this end the invention consists of the improvement in the art and the combinations of parts, as hereinafter described, and more particularly pointed out in the claims at the end of this specification.

Figure 6:
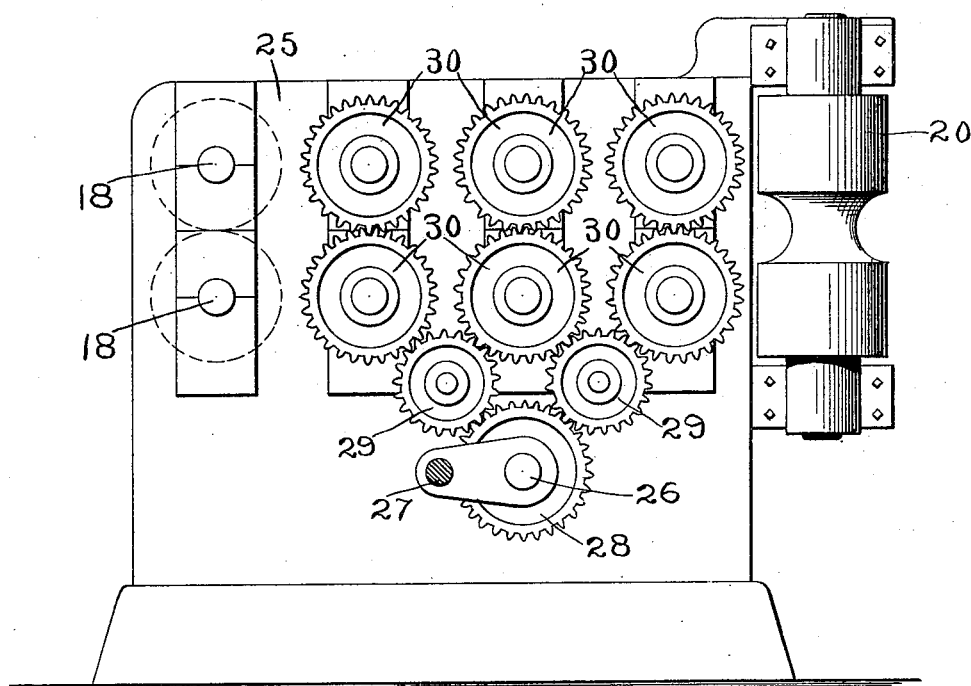
Figure 5:
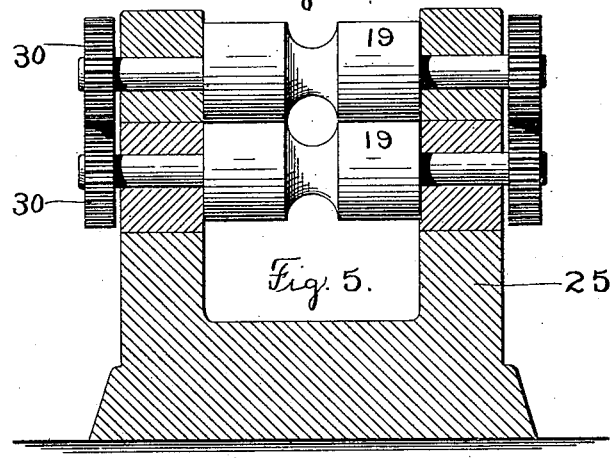
Figures 3, 4:
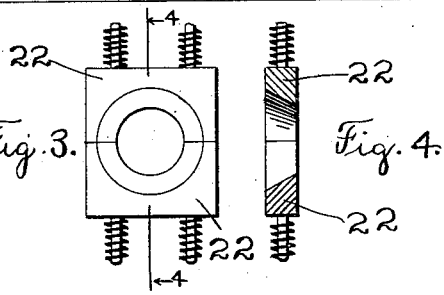

In the accompanying three sheets of drawings, Figure 1 is a diagrammatic view, partly in section, of an apparatus for manufacturing seamless tubes according to this invention. Fig. 2 is a detail view illustrating a portion of the mandrel, a hollow blank or ingot, and a completed section of the tube. Figs. 3 and 4 are detail views of the spring-jaws for removing the completed tube from the mandrel. Fig. 5 is a transverse sectional view of the apparatus for roll-drawing seamless tubing. Fig. 6 is an enlarged view illustrating the gearing which may be employed for turning the drawing-rolls in axial opposition to the advancing movement of the mandrel, and Fig. 7 is an enlarged view illustrating the action of the drawing-rolls.

In the manufacture of seamless tubing prior to the present invention two operations have been found absolutely essential. The first operation or process is what is known as the "hot" process. At the present time the hot process of rolling tubing is carried out by a variety of machines. In the first class of machines for performing the hot process a heated billet or blank is mounted or secured upon a mandrel and is reduced in diameter by ordinary straight-line rolling-machines of a similar construction to those employed for rolling rods. In other cases power has been applied to force the mandrel and blank through rolls which are idle or free to turn. In recent years the apparatus employed in the hot process of tube-rolling has been modified or improved in a variety of ways—as, for example, by the substitution of inclined disks for the straight-line rolling-mills previously employed. These disks have been set at an angle with respect to the path of the mandrel, so as to produce a spiral action, as it were, upon the billet or blank, and various other changes have been made upon specific sets of apparatus employed— that is to say, the advances or improvements in the manufacture of seamless tubing have in recent years been designed with a view of discarding the old type of direct straight-line rolling-mills—and have been produced with a view of perfecting the more complicated types of the variously modified disk rolling-machines. With none of the prior methods of hot-rolling, either practiced with the ordinary straight-line rolling-mills or with the later disk rolling-mills, has it been possible, however, to produce a finished tubing by the hot process alone. All these prior hot-rolling processes affect only the outer layers or surface of the tubing being produced, and the inner layers of the hot-rolled tubes have not heretofore been compacted to the same degree as the outer layers or surface thereof, and in order to produce a finished tubing, it has heretofore been absolutely essential to use an additional or second finishing process. This second finishing process is commonly known as the "cold" process, and it ordinarily consists in drawing the unfinished tubing made by a hot process through a stationary die or dies. This second finishing or cold process will compact and harden the outer layers of the tubing and will produce tubing substantially uniform in diameter; but even after the application of this second finishing or cold process the inner layers of tubing thus produced will be left comparatively soft or of comparatively light density.

The present invention has been designed with a special view of producing finished tubing by a single hot process, thereby eliminating from the manufacture of tubing of this class one set of apparatuses and the entire second finishing or cold process, which is now necessarily employed. To accomplish this result, this invention has returned to the old form of straight-line rolling-mill, and the desired result is accomplished by using the rolls of this old apparatus, so that instead of allowing said rolls to act in the ordinary manner they are turned in opposition to the advancing movement of the ingot. This will cause the rolls to act upon the metal of the blank with a novel heavy roll-drawing action, which will produce a stretching, straightening, and compacting of the fibers under pressure—that is to say, the metal will be supported on the mandrel as upon an anvil and will be caused to flow thereon, as it were, so that the entire mass or body of metal will be uniformly compacted and made homogeneous throughout its thickness—and by this improvement in the art this invention may produce by a single process finished tubing which it has heretofore been impossible to produce without the addition of the second finishing or cold process.

In the accompanying drawings, 10 designates a mandrel which may be reciprocated and simultaneously revolved, if desired, by any ordinary means, as by means of a hydraulic press comprising a piston 13, mounted in a cylinder 11, to which cylinder fluid-pressure may be admitted by means of a controlling-valve 14. To secure the hollow ingot or blank on the mandrel 10 is a grooved table 15, having a pivoted gate or stop 16, which will normally swing down out of the path of the mandrel 10 and which may be supported in its raised position by means of a catch 17. The idle guide-rollers 18 are arranged to direct the mandrel into a pass of uniform diameter between the driven drawing-rolls 19. A plurality of sets of driven drawing-rolls 19 are preferably employed, and the axes of the drawing-rolls may be either horizontal, perpendicular, or at different relative angles with respect to each other, as desired. The drawing-rolls 19 are turned or driven in direct axial opposition to the advancing movement of the mandrel, so that their surfaces of contact move oppositely with respect to the blank, as indicated by arrows in Fig. 7. One form of gearing which may be employed for this purpose is illustrated in Fig. 6. As shown therein, a driving-shaft 26, journaled in housings 25, may be actuated from an engine or other motor through a crank-arm 27. Secured on the driving-shaft 26 is a gear 28, which meshes with and drives intermediate gears 29, which mesh with and turn gears 30 of the drawing-rolls 19. A pair of vertical sizing-rolls 20 are journaled near the ends of the housings 25. A frame 21, having conically-recessed spring-jaws 22, is employed for removing the completed tube from the mandrel. Supporting-rollers 24 may be provided in the ordinary manner for receiving the completed tubes.

In the use of this apparatus the billet or ingot B, having a closed end B′, is heated to a high temperature and placed on the grooved table 15. The controlling-valve 14 is opened to force the mandrel 10 into the hollow billet B. The pressure is then momentarily relieved and the stop 17 raised to allow the gate 16 to move down out of the path of the mandrel. Pressure is again turned on, and the idle-rolls 18 guide the billet or blank into the pass of uniform diameter between the drawing-rolls 19. The drawing-rolls 19, turning or rotating in axial opposition to the operative stroke of the mandrel 10, will produce the heavy roll-drawing action upon the billet or blank B, before described. The mandrel 10 may be moved comparatively slowly, and as the rolls 19 act under heavy pressure the metal will have time to flow upon the mandrel to compact, stretch, and straighten the fibers of the inner layers, as well as the outer layers, of the tubes, producing tubes of great toughness, uniform density, and the metallic fibers of which are parallel with the axes thereof. The marks of the drawing-rolls 19 upon the tubes will be removed by the sizing-rolls 20. When the spring-jaws 22 have engaged behind the end of the completed tube B, the controlling-valve 14 may be turned to admit pressure to the opposite end of the cylinder 11 to retract the mandrel 10, leaving a completed tube in position upon the supporting-rolls 24.

One especial advantage in the use of this invention in manufacturing steel tubing resides in the fact that, although the rolls 19 have a drawing action instead of a rolling action, yet, as they are being constantly turned or rotated, they will have comparatively large wearing-surfaces and will not have to be frequently renewed or replaced, which is the case when stationary drawing-dies are employed.

Tubing produced according to this invention may be, if desired, finished by cold drawing through stationary dies; but where a further finishing is desired the cold blank or tube may again be forced between rollers turning in direct axial opposition to the advancing movement thereof.

Changes may be made in the practice of this invention by those who are skilled in the art without departing from its scope, as expressed in the claims. The invention therefore should not be limited to the details of construction or operation which have been herein shown and described; but

What is claimed, and sought to be secured by Letters Patent, is—

1. The improvement in the art of producing a seamless tube from a hollow ingot or blank, which consists in employing a roll-drawing action for disposing the fibers of the metal under pressure by stretching or straightening them out in parallel lines by forcing said blank supported on a mandrel between rolls having registering grooves of uniform depth, and by rotating said rolls in direct axial opposition to the line of movement of the blank, substantially as described.

2. In a machine for making tubing, the combination of rolls formed with registering, circumferential grooves of uniform depth to form a pass, a mandrel, means for forcing the mandrel through the pass, and means for rotating said rolls so that their surfaces of contact move in direct axial opposition to the advancing movement of the mandrel, substantially as described.

3. In a machine for making tubing, the combination of rolls formed with registering, circumferential grooves of uniform depth to form a pass, a mandrel, a hydraulic press for forcing the mandrel through the pass, and means for rotating said rolls so that their surfaces of contact move in direct axial opposition to the advancing movement of the mandrel, substantially as described.

4. In a machine for making seamless tubes, the combination of a mandrel, a hydraulic press for reciprocating the mandrel, a plurality of sets of drawing-rolls, each set being formed with registering, circumferential grooves of uniform depth to form a pass, and gearing for turning said rolls in axial opposition to the operative stroke of the mandrel, substantially as described.

5. In a machine for making seamless tubes, the combination of a mandrel, means for reciprocating said mandrel, means for securing a hollow blank or ingot on the end of said mandrel, rolls formed with registering, circumferential grooves of uniform depth to form a pass, and gearing for turning the rolls in axial opposition to the operative stroke of the mandrel, substantially as described.

6. In a machine for making seamless tubes, the combination of a mandrel, means for reciprocating said mandrel, means for securing a hollow blank or ingot on the end of said mandrel, rolls formed with registering, circumferential grooves of uniform depth to form a pass, gearing for turning the rolls in axial opposition to the operative stroke of the mandrel, and means for removing the completed tube from the mandrel, substantially as described.

7. In a machine for forming seamless tubes, the combination of a mandrel, a hydraulic press for reciprocating the mandrel, a plurality of sets of drawing-rolls, each set being formed with registering, circumferential grooves of uniform depth to form a pass, gearing for turning said rolls in axial opposition to the operative stroke of the mandrel, and guide-rolls for directing the mandrel into the pass between said rolls, substantially as described.

8. In a machine for making seamless tubes, the combination of a mandrel, a plurality of sets of rolls, each set being formed with registering, circumferential grooves of uniform depth to form a pass, gearing for turning said rolls in axial opposition to the operative stroke of the mandrel, and sizing-rolls journaled at right angles with respect to the drawing-rolls, substantially as described.

9. In a machine for making seamless tubing, the combination of a mandrel, a hydraulic press for reciprocating said mandrel, a table, a gate for holding a hollow blank or ingot on said table in position to be engaged by the mandrel, a plurality of sets of drawing-rolls, each set being formed with registering, circumferential grooves of uniform depth to form a pass, gearing for turning said drawing-rolls in opposition to the operative stroke of the mandrel, guide-rolls for directing the mandrel into the pass between said drawing-rolls, sizing-rolls journaled at right angles with respect to said drawing-rolls, and spring-jaws for engaging a completed tube to remove said tube from the mandrel during the return stroke of said mandrel, substantially as described.

In testimony whereof I have hereunto set my hand in the presence of two subscribing witnesses.

HERBERT R. KEITHLEY.

Witnesses:
MAUCE. SPILLANE,
MURRAY CORRINGTON.